Figure 1:
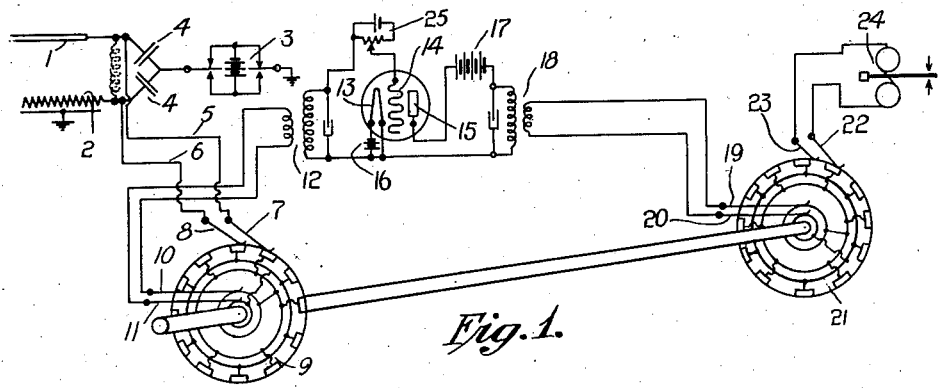

J. W. MILNOR.
AMPLIFIER.
APPLICATION FILED JAN. 17, 1918.

1,378,712.

Patented May 17, 1921.
2 SHEETS—SHEET 1.

WITNESSES:

INVENTOR.
Joseph W. Milnor
BY
ATTORNEY

UNITED STATES PATENT OFFICE.

JOSEPH W. MILNOR, OF NEW YORK, N. Y., ASSIGNOR TO THE WESTERN UNION TELEGRAPH COMPANY, OF NEW YORK, N. Y., A CORPORATION OF NEW YORK.

AMPLIFIER.

1,378,712.  Specification of Letters Patent. Patented May 17, 1921.

Application filed January 17, 1918. Serial No. 212,331.

*To all whom it may concern:*

Be it known that I, JOSEPH W. MILNOR, a citizen of the United States of America, and a resident of New York, county of New York, and State of New York, have invented certain new and useful Improvements in Amplifiers, of which the following is a specification.

My invention relates to a method of and means for amplifying telegraphic signals, and is particularly adapted and intended for amplification of the signals of submarine cables, but is also applicable to the amplification of the signals of other telegraph systems.

According to the present invention, the so-called "audion" or "gas relay" is employed for the amplification of signals. The audion itself is a well known instrument and is not altered in construction for use according to the present invention. Since the frequency of the signals in a cable circuit may be said to vary from 10 to 20 cycles per second, or thereabout, (this frequency of course is variable, but is low as compared with usual alternating current frequencies) and since cable signals, if transmitted by the ordinary method (as distinguished from the "true reversal" method) are not true alternating currents, but may comprise several successive impulses of the same direction, and since the audion is best adapted to amplifying signals when the current of those signals is in the form of relatively high frequency and relatively high voltage with relatively small current (the voltage of cable currents being always low) according to the present invention I introduced between the cable circuit proper, and the audion, means for breaking up the cable current impulses into alternating current impulses of high frequency; and also, preferably, I introduce between the said means for breaking up the cable current impulses into alternating currents of high frequency, and the audion, a "step up" transformer. Also, when this step-up transformer is employed, I introduce between the audion and the signal-receiving, repeating, or translating apparatus of the cable system, a "step down" transformer; and also, preferably, between the audion and the said signal-receiving, repeating, or translating apparatus I interpose a rectifier which reconverts into direct current the alternating current of high frequency, previously produced by the apparatus for that purpose hereinbefore mentioned, whereby the current transmitted to the receiving, repeating, or translating apparatus is reconverted into direct current, except as the cable current impulses as first received may themselves be of opposite directions. The first apparatus for breaking up the cable impulses into alternating currents of high frequency, and the said rectifying apparatus, preferably operate in synchronism, and, with advantage, may be current reversing commutators of the same number of segments and operating at the same rotative speed.

My invention consists in means, intermediate the cable circuit proper and the audion, for breaking up the cable impulses into alternating currents of high frequency; in means, preferably synchronous in operation with the means just above mentioned, for rectifying the said alternating currents after amplification by the audion; in step up and step down transformers located on opposite sides of the audion as above stated; and in other features, as hereinafter described and particularly pointed out in the appended claims.

The objects of my invention are, to provide simple and reliable means for the amplification of cable signals, etc.; to avoid, in such amplification, use of parts subject to the disturbing effects of mechanical inertia; to provide an amplifying apparatus possessing the above advantages, and which is devoid of relay contacts and the like which must be completed and broken in the operation of the apparatus; and in general, provide an amplifying apparatus of extreme simplicity and extreme compactness and of a nature such as will be understood readily by telegraph engineers and operators.

I will now proceed to describe my invention with reference to the accompanying drawings, which illustrate more or less diagrammatically certain embodiments of my invention, and will then point out the novel features in claims.

Figure 2:
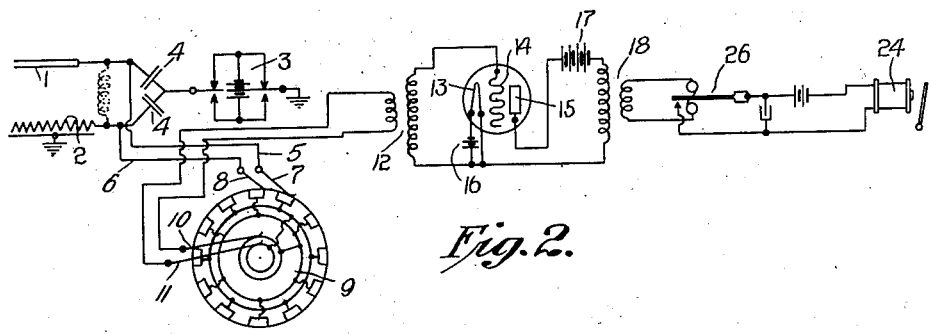

In said drawings:

Figure 1 shows diagrammatically one arrangement of apparatus and circuits embodying my invention, wherein a rotary rectifying commutator is employed; Fig. 2 is a similar diagram wherein, in lieu of a rotary rectifying commutator, a tuned vibrating relay is employed; and Fig. 3 is another diagram similar to Fig. 1 wherein, in lieu of the rotary rectifying commutator, a rectifier of another type is employed.

Figure 3:
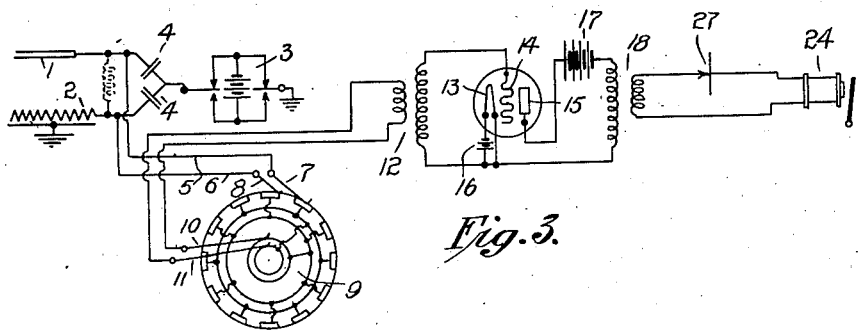
Figure 4:
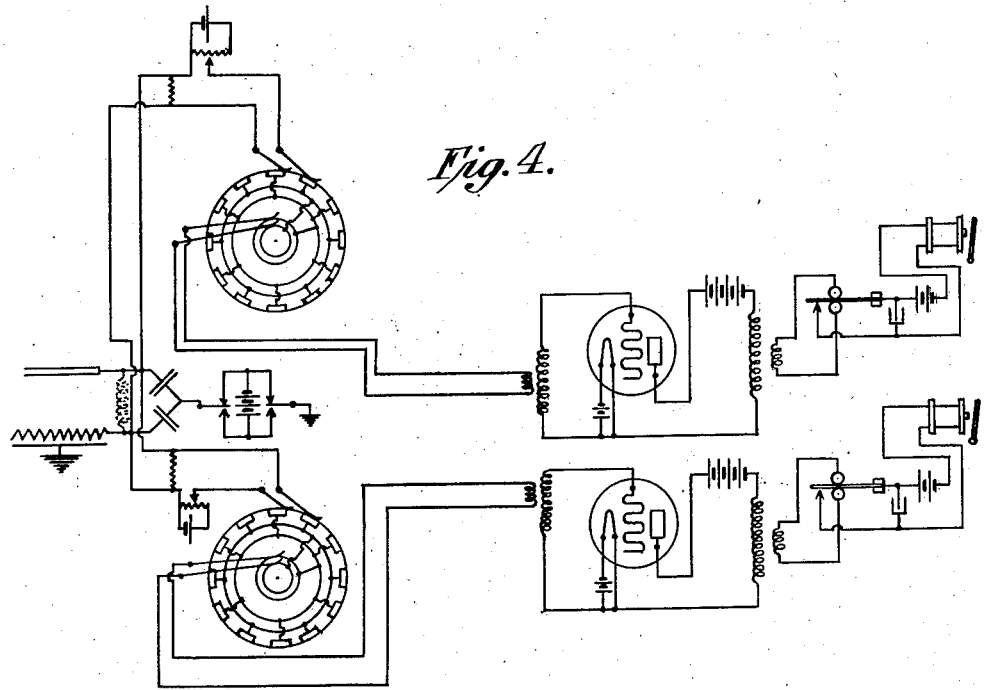

Fig. 4 is a diagram showing how the arrangements of Figs. 2 and 3 may be adapted for distinguishing between positive current, zero current, and negative current.

Referring first to Fig. 1: Submarine cables are usually, though not necessarily, operated "duplex," and in Fig. 1 a duplexed cable is shown; 1 designating the main cable line, 2 the artificial line, 3 the usual transmititng arrangement, and 4—4 the usual condensers in the main and artificial lines respectively. 5 and 6 designate leads from the main line, and artificial line, respectively, to brushes 7 and 8 of a current reversing commutator 9, of the rotary type, whereby each cable impulse is broken up into a large number of alternating current impulses. 10 and 11 designate brushes of this commutator, connected in the primary circuit of step up transformer 12, to the secondary of which transformer is connected an audion of which 13 designates the filament, 14 the grid, and 15 the plate. Current is supplied to the filament by a battery 16 in the usual manner. 17 designates a battery, connected in the plate circuit of the audion, i. e., the circuit in which amplification occurs; in which circuit is included the step down transformer 18; the secondary of this transformer 18 being connected to the brushes 19 and 20 of another commutator, 21, of a nature similar to, and driven in synchronism with, the first mentioned commutator 9; and 22 and 23 designate brushes of this commutator connected to the receiving device 24, which may be either a siphon recorder of ordinary type, or a repeater, or even an ordinary contact-making and -breaking relay of sensitive type.

The operation of the apparatus is as follows:

As will be understood, the operation of the transmitting arrangement 3 does not in any way affect the operation of the receiving instrument, a proper balance between the main and artificial lines being assumed to exist. Consequently the operation of the transmitting arrangement will not be referred to further. Incoming signals, consisting of positive impulses, or negative impulses, usually more or less frequently alternated, are each split up by the receiving commutator 9 into alternating impulses of a relatively high frequency, and such alternating currents are stepped up in voltage by the transformer 12, passing from the secondary of that transformer through the potentiometer 25 and thence to the grid 14 (if that potentiometer be employed; otherwise direct from the secondary of the transformer to the grid); and thence across the gap between the grid and the filament back to the secondary of the transformer. As is well known, the current from the battery 17 tending to pass from the plate 15 of the audion to the filament, is affected by the oscillations impressed thereon by the voltage on the grid, with the result that in the primary of the induction coil 18, a greatly amplified current corresponding absolutely, however, in other respects, to the current in the secondary of the transformer 12, is produced and thereby a current is induced in the secondary of transformer 18 which, being rectified by the rectifying commutator 21, operates the receiving instrument 24.

This receiving instrument 24 may be a siphon recorder; or it may be an ordinary telegraph relay, preferably one of sensitive type. I have operated with success both an ordinary land line relay, and a Brown drum cable relay by the means above described.

It is to be understood that I do not limit myself to a rotary commutator for breaking up the incoming impulses into alternating currents, but may employ in lieu of such rotary commutator any other means suitable for the purpose, or any other means which will break up each of the low period cable impulses into a large number of impulses, direct or alternating; for direct current impulses in the primary of the transformer 12 will produce alternating impulses in the secondary of that transformer, as is well known.

Also, it is not necessary to use a rotary rectifier, such as the commutator 21 of Fig. 1. In Fig. 2, in lieu of such rotary rectifier, I have indicated a tuned vibrating relay 26: such relay being tuned to oscillate its armature in unison with alternating current impulses of the audion circuit (and therefore, of course, in unison with the alternating currents produced by the commutator 9). Such relays are well known and need not be described in detail. The relay 26 operates, by its contacts, the receiving device 24, through a local circuit.

In lieu of a rotary rectifier, such as the commutator 21, I may use a crystal rectifier or an electrolytic rectifier. This is illustrated in Fig. 3, in which 27 designates any of these other types of rectifier.

Also in Figs. 2 and 3 the potentiometer 25 has been omitted. It is desirable to employ this potentiometer as it increases materially the efficiency of the audion; but the use of a potentiometer in connection with an audion is well known.

A cable amplifier, in order that it may amplify signals transmitted in the ordinary manner and based upon the ordinary code, should be capable of distinguishing between positive current, negative current, and 0 current conditions in the repeating of such signals. This is also true with respect to signals transmitted in various special codes, for example the Baudot; such distinction the various forms of amplifier above described are capable of making. The arrangement shown in Fig. 1 requires no alteration for such distinctions. But the arrangements shown in Figs. 2 and 3 require, or at least make desirable, the use of two separate audions, one for positive current and the other for negative current, as indicated in Fig. 4, each having its independent receiving device 24. In connection with each audion a potentiometer 25 is provided, the batteries of these two potentiometers being of reverse sign. While in Fig. 4, the particular rectifying device shown is a tuned relay 26, it will be understood that for this tuned relay its equivalent, the crystal or other rectifier 27 may be substituted.

What I claim is:

1. Signal amplifying apparatus such as described, comprising, in combination with an audion, step up and step down transformers, the former controlling the controlling circuit of the audion, and the latter controlled by the controlled circuit of the audion, and means for breaking up incoming signal impulses each into a large number of separate impulses of high frequency as compared with the incoming impulses, and for causing such high frequency impulses to operate the audion through the step up transformer, means for reconverting the high frequency impulses, as amplified by the audion, into low frequency impulses corresponding to those of the incoming signals, and signal receiving means operated by such amplified low frequency impulses.

2. Signal amplifying apparatus such as described, comprising, in combination with an audion, a step up transformer controlling the controlling circuit of the audion, means comprising a make and break device for breaking up incoming signal impulses each into a large number of separate impulses of high frequency as compared with the incoming impulses, and for causing such high frequency impulses to operate the audion through the step up transformer, and signal receiving means operated by such amplified impulses.

3. Signal amplifying apparatus such as described, comprising, in combination with an audion, step up by step down transformers, the former controlling the controlling circuit of the audion and the latter controlled by the controlled circuit of the audion, means for breaking up incoming signal impulses each into a large number of separate alternating current impulses of high frequency as compared with the incoming impulses, and for causing such alternating current high frequency impulses to operate the audion through a step up transformer, means for reconverting the high frequency impulses, as amplified by the audion, into low frequency direct current impulses corresponding to those of the incoming signals, and signal receiving means operated by such amplified low frequency impulses.

4. Signal amplifying apparatus such as described, comprising, in combination with an audion, step up and step down transformers, the former controlling the controlling circuit of the audion, and the latter controlled by the controlled circuit of the audion, a current reverser arranged to break up incoming signal impulses each into a large number of separate alternating current impulses of high frequency as compared with the incoming impulses, and for causing such high frequency impulses to operate the audion through the step up transformer, a rectifier for reconverting the high frequency impulses, as amplified by the audion, into low frequency direct current impulses corresponding to those of the incoming signals, and signal receiving means operated by such amplified low frequency impulses.

5. Signal amplifying apparatus such as described, comprising, in combination with an audion, step up and step down transformers, the former controlling the controlling circuit of the audion, and the latter controlled by the controlled circuit of the audion, two synchronously operating commutators, one arranged to convert the incoming signal impulses each into high frequency alternating current impulses and connected to cause such alternating current impulses to operate the audion through the step up transformer, the other arranged to rectify the high frequency impulses, as amplified by the audion, into low frequency impulses corresponding to those of the incoming signals, and signal receiving means operated by such amplified low frequency impulses.

In testimony whereof I have signed this specification in the presence of two subscribing witnesses.

JOSEPH W. MILNOR.

Witnesses:
H. M. MARBLE,
ETHEL JOHNES.